July 7, 1964  S. SAJ  3,139,679
METHOD FOR FORMING HEAT-EXCHANGE DEVICES
Filed May 16, 1961

INVENTOR.
STANLEY SAJ,
BY
McMorrow, Berman & Davidson
ATTORNEYS.

United States Patent Office 3,139,679
Patented July 7, 1964

3,139,679
METHOD FOR FORMING HEAT-EXCHANGE DEVICES
Stanley Saj, 820 Brunner St., Peru, Ill.
Filed May 16, 1961, Ser. No. 110,487
1 Claim. (Cl. 29—471.1)

This invention relates to heat-exchange devices and, more specifically the invention pertains to a method for making the same, and this invention comprises a continuation-in-part of my copending application Serial No. 729,-372, filed April 18, 1959, entitled "Heat Transfer Device," which issued on June 20, 1961, as U.S. Patent No. 2,989,-290.

The instant invention is directly related to a method or process for forming or manufacturing heat exchangers, and is particularly concerned with the assembly, soldering, or the use of other connecting means for assembling heat transfer elements having fluid-tight chambers formed therein.

One of the primary objects of this invention is to provide a method for securing a plurality of heat-exchange units or elements in such a manner as to provide fluid cooling passages therebetween.

A further object of this invention is to provide a method for assembling a plurality of heat-exchange units or elements of the type referred to above to form a core of any desired dimension and wherein any desirable coolant medium may be employed.

A still further object of this invention is to provide a method or means for assembling a plurality of heat-exchange units in a united form to provide a heat transfer core employing a fluid medium.

A still further object of this invention is to provide a method for holding and uniting a plurality of heat-exchange units or elements in heat-transfer relationship relative to each other.

Yet another object of this invention is to provide a method or process for soldering a plurality of heat-exchange elements or units together to form a single radiator core for an automotive vehicle.

A still further object of this invention is to provide a method for forming a heat-exchange device comprising a radiator core for conventional automotive vehicles, the core being formed with a plurality of laterally-spaced and parallel fluid passages, the passages being formed by the soldering together of opposed longitudinally-extended edges of a plurality of radiator core sections, units, or elements, the process including the soldering of central portions of the sections, units, or elements, which extend between adjacent ones thereof.

It is still another object of this invention to provide a method or process for forming a motor vehicle radiator of the cellular type that has a relatively high degree of heat-radiating surface.

Again, a still further object of this invention is to provide a method or process for forming an automotive vehicle radiator core which possesses the optimum of strength and rigidity to effectively resist all strains and stresses normally encompassed by such structures in conventional use, and wherein the method effectively bonds the component elements or units of the core in such a manner as to reduce and/or substantially obviate any tendency of the same to bend or become distorted in such a manner as to cause a separation of the bonded portions thereof.

Further, it is well-known and common practice in the formation of radiator cores to dip-seal the edges thereof in solder or other molten fluid metals, but no method heretofore devised has proved to be successful in the sealing of the partitions or dividers which are disposed between the edges of the core elements and which serve to define therewith the fluid passages through which the coolant passes. Thus, under high steam pressures, severe vibrations, and other conditions of strain and stress, the core has the tendency to become distorted and damaged to the extent that its efficiency as a heat-exchange device is materially reduced, or is rendered completely inoperative. Consequently, this invention contemplates, as a still further object thereof, the provision of a method or process for sealing the partitions or divisions spaced inwardly of the side edges of the radiator core and serving to define fluid passages therebetween.

In reference to this process or method, the same will be hereinafter referred to as "center sealing."

It is a still further object of this invention to provide a center sealing process for center sealing the units or elements making up the core of an automobile radiator, the process being non-complex to carry out, inexpensive to practice, and which results in a superior end product.

Other and further objects and advantages resulting from the practice of this invention will become more evident from a consideration of the following specification when read in the light of the annexed drawing, in which.

Figure 6:
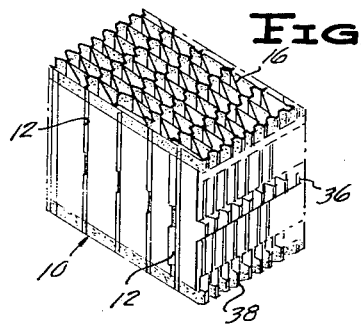
FIGURE 6 is a perspective view of a completed radiator core wherein the side edges and center portions of the assembled radiator core units have been soldered together.

Referring now more specifically to FIGURE 6 of the drawing, reference numeral 10 designates, in general, a fragment of an automobile radiator core constructed in accordance with the teachings of this invention. The core 10, as herein formed, is provided with a plurality of passages 12 through which the coolant medium, such as water, is free to pass. The heat absorbed by the coolant is thrown off or transferred to a stream of air passing through the core. The core 10 is seen to be constructed from a plurality of units or elements 14, each of identical structure, and consequently, the description of one is the description of the others. Hence, like reference numerals identify corresponding elements in each unit.

Each unit 14 is seen to comprise an elongated accordion or zigzag-shaped fin 16 having alternating apices 18, 20 and a pair of corrugated side members 22, 24 to the apices 26, 28 of which, respectively, the apices 18, 20 are secured by a soldering method to be described, and the adjacent ends 30, 32 are overlapped and also soldered or secured by any desired method.

Figure 1:
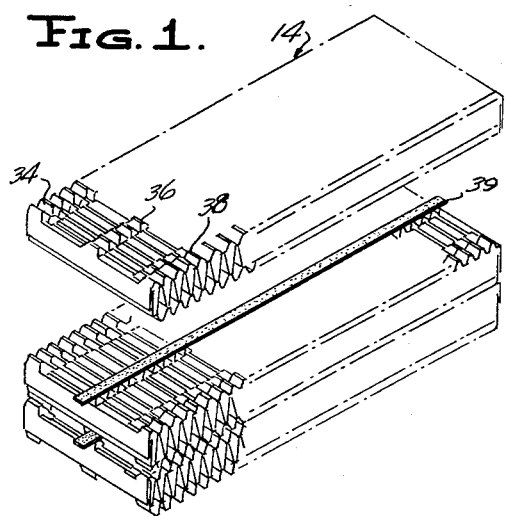
FIGURE 1 is an exploded perspective view of a plurality of radiator core units, FIGURE 1 illustrating one step of the method employed in this invention in the formation of a complete radiator core.

In the perspective view of FIGURE 1 it is seen that each of the side members 22, 24 is formed of a plurality of series of upstanding corrugations 34, 36, and a series of longitudinally-extending corrugations 38 which are disposed in aligned spaced relation centrally of the marginal edges thereof and forming between the pairs of corrugations 34, 36 and 36, 38 a pair of outwardly-opening grooves therebetween the function of which will become apparent below. As is seen in the several figures of the drawing, the alternating apices of the corrugations 34, 36, 38 are designed to be secured, as by soldering, to the apices 18, 20 of the fin 16. To form the core 10, illustrated in FIGURE 6 of the drawing, it is essential that a plurality of units 14 be assembled and fixedly secured together, preferably by soldering.

Figure 2:
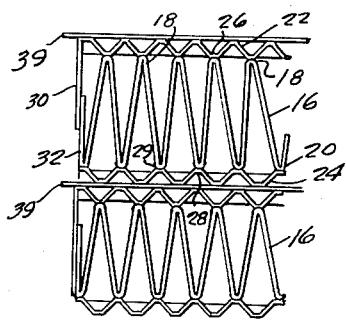
FIGURE 2 is an enlarged fragmentary side elevational view of two of the core units illustrated in FIGURE 1, prior to connecting of the same together.

To form the core 10, a plurality of the units 14 are juxtaposed in abutting relationship with the immediately opposed or confronting corrugations 34, 36, 38 of each adjacent pair of units disposed in such a manner as to nest when joined. However, prior to the juxtaposition of each adjacent pair of the units 14, a strip of solder 39 is placed between the confronting pairs of the corrugations 36, in the manner shown in FIGURES 1 and 2.

Figure 3:
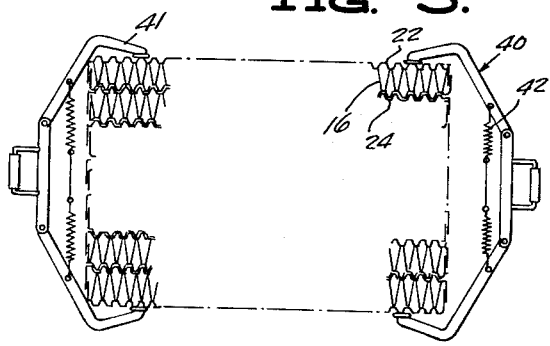
FIGURE 3 is a side elevational view of a plurality of the core units held in abutting relationship relative to each other by means of clamps, just prior to the dipping step.
Figure 5:
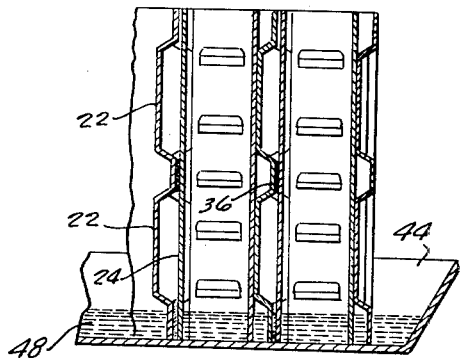
FIGURE 5 is an enlarged detail cross-sectional view, FIGURE 5 being taken substanitially on the vertical plane of line 5—5 of FIGURE 4, looking in the direction of the arrows.
Figure 4:
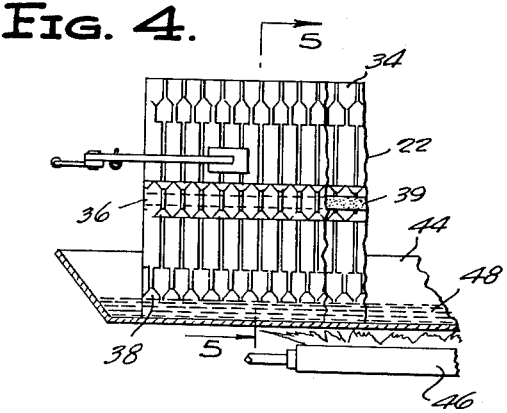
FIGURE 4 is a side elevational view of the core units the units having been turned 90 degrees from the position shown in FIGURE 3, and illustrating the edges of the same as being disposed in a solder bath.

With the units so arranged and disposed, the same are held in their respective positions by means of manually-operable clamps 40 having arms 41 which engage against the outer sides of the side members 22, 24 in the manner shown in FIGURES 3 and 4. The arms 41 are biased for movement toward one another by spring tension means 42. The clamps and elements associated therewith form no part of this invention.

Reference numeral 44 denotes a suitable vessel supported above a burner 46 and containing molten solder or other molten metal materials. The assembled units 14, as described above, and clamped together by means of the clamps 40, are then edge-dipped within the solder 48, the dipping taking place adjacent the longitudinally-extending edges of the assembled units. The assembled units 14 are then turned 180 degrees from their position shown in FIGURE 4, and the other longitudinally-extending edges of the units are then soldered together.

Now, during the edge-dipping of the units 14, the solder strip 39 is heated by conduction and is reduced to its fluid stage to effect the soldering of the nesting center corrugations 36. The finished radiator core unit 10 is then permitted to cool and when in its cooled assembled form as shown in FIGURE 6, the core is ready for use.

The core 10 is preferably formed of copper and may be made of any desired length, width, or depth. The selection of the type of metal is, of course, optional.

Having described and illustrated one method for constructing an automobile radiator core in accordance with the teachings of this invention, it will be understood that the same is offered merely by way of example, and that the instant invention is to be limited only by the scope of the appended claim.

What is claimed is:

A method for center sealing a radiator core formed of a plurality of metallic radiator units having a series of nested longitudinally-extending upright marginal corrugations and an intermediate centrally-disposed nested series of corrugations extending parallel thereto; the steps of inserting a strip of solder between each adjacent pair of nested central corrugations, clamping said units together in nesting relationship, and dipping only said longitudinally-extending marginal corrugations at their respective edges in molten metal to seal the same one to the other and to melt said solder strip by heat of conduction to seal said center corrugations of each unit, one to another, in nested relation.

References Cited in the file of this patent

UNITED STATES PATENTS

| | | |
|---|---|---|
| 2,137,348 | Przyborowski | Nov. 22, 1938 |
| 2,191,631 | Shutts et al. | Feb. 27, 1940 |
| 2,571,631 | Trumpler | Oct. 16, 1951 |
| 2,926,421 | Sandberg | Mar. 1, 1960 |